July 7, 1970  TAKESHI OKU ET AL  3,519,784
ANNULAR WELDING AID FOR USE IN STUD WELDING
Filed May 4, 1966

INVENTORS
Takeshi Oku
Takashi Shibano

BY *Stevens, Davis, Miller & Mosher*
ATTORNEYS

United States Patent Office 3,519,784
Patented July 7, 1970

3,519,784
ANNULAR WELDING AID FOR USE IN STUD WELDING
Takeshi Oku and Takashi Shibano, Suita-shi, Japan, assignors to Matsushita Electric Industrial Co., Ltd., Osaka, Japan, a corporation of Japan
Filed May 4, 1966, Ser. No. 547,565
Int. Cl. B23k 9/20
U.S. Cl. 219—98                              3 Claims

ABSTRACT OF THE DISCLOSURE

A welding aid for use in welding studs to a flat plate comprising an annular body made of slag-forming material having a central bore therein and a plurality of cut-out portions or recesses on the lower portion thereof. Since the body is of a semi-conductive material, it partially melts and assists in forming a uniform weld while the cut-out portions control the amount of weld deposition.

---

Figure 1A:
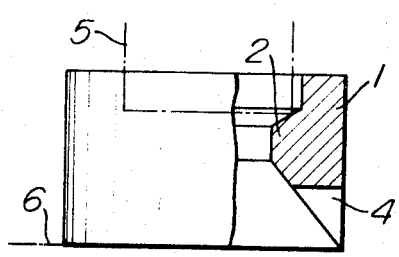

This invention relates to improvements in the structure of welding aids for use in stud welding and more particularly to those of substantially annular shape formed from a slag-forming material.

It is commonly already known in the art that an annular welding aid of slag-forming material is generally used for the successful initiation and holding of arc in stud welding of the type in which an arc is continuously maintained for a certain period of time between two workpieces to be welded together and then these two workpieces are brought into pressure contact with each other so that one of the workpieces, for example, a rod-shaped metal piece such as a bolt can be welded to the other workpiece, that is, a block of base metal. This type of slag-forming welding aid is disclosed for example in Japanese Pat. No. 242,927. In order to avoid any confinement of slag in the welded portions of the two workpieces, the cavity of the slag-forming welding aid on the side adjacent the base metal is designed to have an inside diameter which is larger than the outside diameter of the rod-shaped metal piece to be welded to the base metal and is also designed to have a volume which is larger than the sum of that portion of the volume of the rod-shaped metal piece which is advanced into the slag-forming welding aid after the slag-forming welding aid has been locally softened and the volume of the softened portion of the slag-forming welding aid. In addition to the above, a sheet material such as a paper tape is wound about the outer periphery of the slag-forming welding aid to reinforce the same so that a uniform arc holding time can be maintained even if cracks should develop in the slag-forming welding aid due to the heat of arc or the like.

However, practical welding operation by the use of the welding aid described above has encountered frequent difficulties with confinement of slag in the welded portions, a great degree of fluctuation in the arc holding time and spouting outwardly of molten metal due to development of cracks at a lower part of the welding aid. Thus it has been impossible to completely avoid the imperfection of welds and this point has been a serious defect in stud welding of the type utilizing the slag-forming welding aid.

In an attempt to eliminate the defect involved in the use of such slag-forming welding aid, provision for means such as perforations, notches or recesses at the middle portion of the side wall of a slag-forming welding aid of annular shape for thereby locally reducing the wall thickness at the middle portion of the side wall was disclosed in and was already known from Japanese Utility Model Registration No. 726,587. While this type of annular welding aid has been proved quite satisfactory in respect of its capability of giving a good welding effect since the wall thickness at the middle portion of the side wall is locally made less than the wall thickness of the lower side wall portion thereof, this annular welding aid has still been defective in that its rate of yield is quite low due to the fact that special shaping tools are required to form perforations, notches or recesses at the middle portion of the side wall of such annular welding aid and therefore a great deal of difficulty is encountered in the manufacture of the same.

With a view to eliminate all of the prior defects as described above, it is the primary object of the present invention to provide an annular welding aid of slag-forming material of improved structure which can easily be manufactured and yet can give a good welding effect. According to the present invention, a plurality of notches and/or recesses of suitable shape are disposed at the lower portion of the side wall or disposed to extend from the lower portion to the middle portion of the side wall of an annular welding aid of slag-forming material so that the wall thickness of the side wall is locally reduced at its lower portion or at both of its lower portion and middle portion.

Figure 2A:
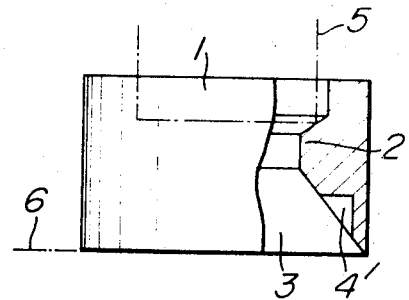
Figure 1B:
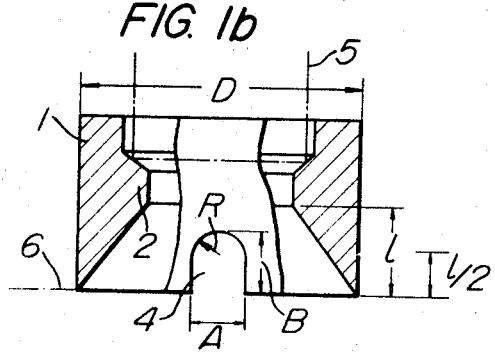
Figure 2B:
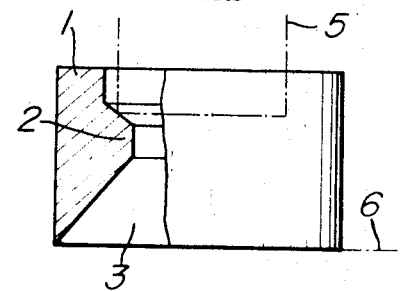
Figure 1C:
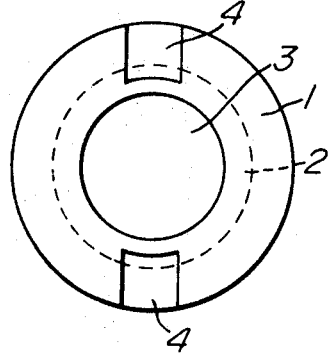
Figure 2C:
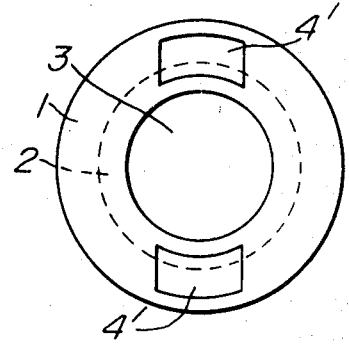

The above and other objects, advantages and features of the present invention will become apparent from the following description with reference to the accompanying drawings, in which:

FIGS. 1a, 1b and 1c are a partly cut-away front elevational view, a partly cut-away side elevational view and a bottom view of an embodiment of the annular welding aid according to the invention, respectively; and FIGS. 2a, 2b and 2c are a partly cut-away front elevational view, a partly cut-away side elevational view and a bottom view of another embodiment according to the invention, respectively.

Referring to FIG. 1, there is shown an annular welding aid 1 made from a slag-forming material which is provided with a central axial bore. The lower part of the upper portion of the central axial bore is narrowed by an inward extension of the side wall to form a projection 2 for supporting thereby a rod-shaped metal piece such as a stud. The lower portion and middle portions of the central axial bore is outwardly downwardly tapered to form a cavity 3 which is adapted to be placed upon a block of base metal 6. The uppermost portion of the central axial bore has a suitable diameter to loosely receive therein a rod-shaped metal piece 5 such as a stud. At that portion of the side wall which underlies the supporting projection 2, there are provided a plurality of notches 4, here shown as a pair of notches on opposite sides by way of example. These notches 4 are disposed at such portion of the annular welding aid 1 which is adjacent the base metal 6.

The structure of an annular welding aid shown in FIG. 2 is substantially the same as that shown in FIG. 1 except that a pair of spaced apart recesses 4' in lieu of the notches 4 are provided at the lower and middle portions of the central axial bore. These recesses 4' are an outward extension of the cavity 3 and are disposed at such portion of the annular welding aid 1 which is adjacent the base metal 6.

By virtue of the structure of annular welding aid made from a slag-forming material as described above according to the present invention, the softened portion of the slag-forming welding aid flows partly outwardly during welding and thus there is no possibility of confinement of slag in the weld. Further, reduction of gas pressure in the cavity 3 of the annular welding aid during the period of arc continuation gives an advantage that no crack develops at the lower portion of the annular welding aid and therefore exposure of the molten pool to the external atmosphere and improper spouting of molten metal to the outside can effectively be avoided. Since moreover a portion of the molten metal escapes outwardly when the arc holding time is relatively long but does not escape outwardly when the arc holding time is short, the amount of outwardly escaping molten metal can automatically be controlled depending on the duration of arc holding and the amount of deposited metal can always be maintained at a constant value. It will be appreciated that the shape and number of the notches or recesses disposed at the lower portion of the side wall or disposed to extend from the lower portion to the middle portion of the side wall may suitably be selected so that the marked effect exhibited in the area of this reduction which is not limited to the middle portion but extends to the lower portion of the side wall and is comparable to the case where such portion is solely limited to the middle portion of the side wall.

It will be understood that the present invention having the structure as described above gives many advantages including freedom from confinement of any slag in the weld, deposition of a proper amount of weld metal as reinforcement, beautiful appearance of the weld, and uniformity in the appearance, metallurgical properties and mechanical strength of the weld. Further advantages derivable from the invention are ease of manufacture and resultant improvement in the rate of yield without any need for special shaping tools because means such as notches or recesses are provided at the lower portion or at the lower portion and the middle portion of the side wall to reduce the wall thickness at that portion or at those portions of the side wall.

According to results of experiments made by the inventors by use of the annular welding aid as shown in FIG. 1, a most satisfactory welding effect could be obtained when the number of the notches 4 is two to four and the diameter D of the annular welding aid 1, the width A of the notch 4, the height B of the notch 4, the radius R of the semicircular portion of the notch 4 and the height $l$ of the cavity 3 have the following interrelations.

$$0.5l \leq B \leq l$$

$$0.15D \leq A \leq 0.3D$$

$$R \doteq 0.5A$$

What is claimed is:

1. An annular welding aid for use in stud welding comprising a substantially annular body of slag-forming material having an axial central bore therein, an intermediate portion of the body having a wall thickness greater than other portions of the body to form a projection defining a narrowed bore therein, the wall thickness of the body below said projection becoming increasingly small in going toward the lower end of the body whereby the bore becomes increasingly wider, at least one cut-out portion being disposed to extend between said intermediate portion and said lower end of the body, the height of said cut-out portion being 0.5–1.0 the height of said projection from the lower end and the circumferential width of said cut-out portion being 0.15–0.3 the outer diameter of the body.

2. An annular welding aid according to claim 1, wherein cut-out portions extend radially outwardly from inside the bore to the outside of the wall of the said body.

3. An annular welding aid according to claim 1, wherein the cut-out portions extend radially outwardly from inside the bore to reduce locally the wall-thickness of said body at that portion.

References Cited

UNITED STATES PATENTS

| 2,510,000 | 5/1950 | Van DerWilligen et al. 219—99 |
| 2,985,744 | 5/1961 | Van DenBlink et al. 219—99 |
| 3,037,109 | 5/1962 | Glover 219—99 |
| 3,079,488 | 2/1962 | Clevers 219—99 |
| 3,182,173 | 5/1965 | Dash 219—99 |
| 3,291,438 | 12/1966 | Logan 219—99 X |
| 2,936,362 | 5/1960 | Brown et al. 219—99 |

FOREIGN PATENTS

| 955,954 | 4/1964 | Great Britain. |

RALPH F. STAUBLY, Primary Examiner